United States Patent
Zou et al.

(10) Patent No.: US 10,440,735 B2
(45) Date of Patent: Oct. 8, 2019

(54) UPLINK HOPPING PATTERN FOR CONTENTION-BASED RELIABLE COMMUNICATION

(71) Applicant: Telefonaktiebolaget LM Ericsson (publ), Stockholm (SE)

(72) Inventors: Zhenhua Zou, Solna (SE); Malik Wahaj Arshad, Sigtuna (SE); Gustav Wikström, Täby (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/756,224

(22) PCT Filed: Nov. 15, 2017

(86) PCT No.: PCT/SE2017/051133
§ 371 (c)(1),
(2) Date: Feb. 28, 2018

(87) PCT Pub. No.: WO2018/101874
PCT Pub. Date: Jun. 7, 2018

(65) Prior Publication Data
US 2019/0029030 A1 Jan. 24, 2019

Related U.S. Application Data

(60) Provisional application No. 62/427,644, filed on Nov. 29, 2016.

(51) Int. Cl.
*H04W 72/12* (2009.01)
*H04B 1/7143* (2011.01)
*H04W 72/04* (2009.01)

(52) U.S. Cl.
CPC ...... *H04W 72/1284* (2013.01); *H04B 1/7143* (2013.01); *H04W 72/0446* (2013.01)

(58) Field of Classification Search
None
See application file for complete search history.

(56) References Cited

U.S. PATENT DOCUMENTS

| 6,795,413 B1* | 9/2004 | Uhlik | H04W 48/12 370/330 |
| 2005/0141596 A1* | 6/2005 | Black | H04B 1/715 375/133 |

(Continued)

FOREIGN PATENT DOCUMENTS

| WO | 2009136833 A1 | 11/2009 |
| WO | 2018101877 A1 | 6/2018 |

OTHER PUBLICATIONS

International Search Report and Written Opinion dated Mar. 16, 2018 for International Application No. PCT/SE2017/051133 filed on Nov. 15, 2017, consisting of 13-pages.

*Primary Examiner* — Anh Ngoc M Nguyen
(74) *Attorney, Agent, or Firm* — Christopher & Weisberg, PA

(57) ABSTRACT

A method, wireless device, and network node for scheduling uplink transmissions for at least one wireless device. The method, in the wireless device, includes defining a set of time-frequency uplink transmission hopping patterns for the at least one wireless device, assigning to a first wireless device of the at least one wireless device, a first time-frequency uplink transmission hopping pattern from the set of time-frequency uplink transmission hopping patterns, and receiving, from the first wireless device, an uplink transmission of data packets, the uplink transmission based on the assigned first time-frequency uplink transmission hopping pattern.

16 Claims, 7 Drawing Sheets

(56) References Cited

U.S. PATENT DOCUMENTS

| | | | |
|---|---|---|---|
| 2009/0257396 A1 | 10/2009 | Eliezer et al. | |
| 2009/0279587 A1* | 11/2009 | Eriksson | H04B 1/7143 375/133 |
| 2011/0124347 A1* | 5/2011 | Chen | H04W 64/00 455/456.1 |
| 2012/0300744 A1 | 11/2012 | Larmo et al. | |
| 2014/0307667 A1 | 10/2014 | Wager et al. | |
| 2017/0126275 A1* | 5/2017 | Kwon | H04B 1/7143 |

* cited by examiner

UPLINK HOPPING PATTERN FOR CONTENTION-BASED RELIABLE COMMUNICATION

CROSS-REFERENCE TO RELATED APPLICATIONS

This application is a Submission Under 35 U.S.C. § 371 for U.S. National Stage Patent Application of International Application Number: PCT/SE2017/051133, filed Nov. 15, 2017 entitled "UPLINK HOPPING PATTERN FOR CONTENTION-BASED RELIABLE COMMUNICATION," which claims priority to U.S. Provisional Patent Application No. 62/427,644, filed Nov. 29, 2016, entitled "UL HOPPING PATTERN FOR CONTENTION-BASED RELIABLE COMMUNICATION," the entireties of both of which are incorporated herein by reference.

TECHNICAL FIELD

The present disclosure relates to a method and system for wireless communications, and in particular, a method, network node, and wireless device for determining time-frequency hopping patterns for wireless devices in a communications network for providing contention-based reliable communication.

BACKGROUND

Fifth generation (5G) wireless communication systems are envisaged to expand usage scenarios and applications with respect to current mobile network generations. Ultra-Reliable Low-Latency Communications (URLLC) with strict latency and reliability requirement was agreed as one key scenario for 5G. URLCC demands an ultra-high delivery reliability of 99.999% (five nines) or even higher, within a delivery latency bound as low as half a millisecond. URLLC is of highest importance to enable a range of application including:

Intelligent transportation systems of connected cars;
Monitoring of smart grids with distributed renewable energy sources;
Factory automation with communication among actuators, sensors and controllers;
Remote surgery, remote machine operation, etc.

Each scenario might require a different set of latency and reliability requirements, e.g., 3-5 ms latency with $1-10^{-5}$ reliability for smart grids, and 1 ms latency with $1-10^{-9}$ reliability for factory automation, etc.

Candidate communication systems to fulfill such requirements and use-cases are, e.g., Long Term Evolution (LTE) and a newly developed radio access called New Radio (NR) by the 3rd Generation Partnership Project (3GPP).

With respect to LTE uplink (UL) transmissions, a wireless device, such as, for example, a user equipment (UE) waits for the next transmission opportunity to send a scheduling request. Afterwards, a network node, such as, for example, an evolved Node B (eNodeB or eNB) allocates a set of resources to the wireless device. As one part of the URLLC requirements, some standardization works have been done in LTE rel-14 and are on-going for LTE rel-15 to reduce latency down-to sub-milliseconds.

In order to remove the latency due to the waiting time of the scheduling request, UL semi-persistent scheduling (SPS) has been standardized in LTE from rel-8 and new features introduced in rel-14, such as skip padding when the buffer is empty and the periodicity is reduced to 1 millisecond. SPS pre-allocates the transmission resources to the wireless device, in anticipation of possible packet transmissions. Consequently, the latency due to scheduling request is reduced to zero. Wireless devices do not use the allocated resource to transmit data if it does not have any packet to transmit.

Another approach to address latency reductions is to reduce the transport time of data and control signaling, by reducing the length of a transmission time interval (TTI), i.e., the smallest scheduling unit. This is called Short TTI (sTTI). The latency is reduced, due to a smaller waiting time for sending scheduling request As a result of latency reduction, a higher number of transmissions or re-transmissions through Hybrid Automatic Repeat Request (HARQ) can be allocated within the latency bound to boost the reliability to the target number. These (re)transmissions can be allocated in both time and frequency. The pre-allocated resources in SPS (with more than one transmission opportunities to satisfy the reliability) might be wasted if the wireless device does not have anything to send. For sTTI, more resources are needed in the frequency domain due to short duration in time domain, and this quickly leads to a shortage of frequency resources.

SUMMARY

The present disclosure advantageously provides a method and system in which a subframe-fixed or dynamically varying time-frequency hopping pattern is granted to each wireless device by a network node for UL transmissions. The wireless device can use these physical resources to transmit duplicated or soft-combined packets for the delivery of a single URLLC message (if it has any). The overlapping of time-frequency resource blocks is allowed between two hopping patterns.

In the present disclosure, a set of time-frequency hopping patterns is defined and described for wireless device UL transmissions. Each wireless device is assigned a hopping pattern explicitly from the network node on the RRC layer, and the wireless device uses these physical resources to transmit duplicated or soft-combined packets for the delivery of a single URLLC message, if it has any. Hopping patterns might partially overlap in time-frequency resource blocks so that a collision could happen between two wireless devices if they both have packets to transmit.

The present disclosure provides an orchestrated uplink contention access, with an emphasis on repetitive transmissions for low-load URLLC. This is in contrast to a contention-free transmission scheme that wastes resources, and to a pure random contention access that suffers from a larger collision probability. Extra information can be embedded in the fixed hopping pattern assigned by the network node to the wireless device for an efficient scheduling at the network node. In one embodiment, the redundant version of the HARQ transmission can be encoded in the location of the resources. In another embodiment, the knowledge of the hopping pattern further facilitates efficient re-scheduling of resource blocks once collisions are detected.

Some embodiments advantageously provide a method, wireless device, and network node for determining time-frequency hopping patterns for wireless devices in a communication network in order to provide contention-based reliable communication. According to one aspect, a method in a network node for scheduling uplink transmissions for at least one wireless device is provided. The method includes defining a set of time-frequency uplink transmission hopping patterns for the at least one wireless device, assigning to a first wireless device of the at least one wireless device, a first time-frequency uplink transmission hopping pattern from the set of time-frequency uplink transmission hopping patterns, and receiving, from the first wireless device, an uplink transmission of data packets, the uplink transmission based on the assigned first time-frequency uplink transmission hopping pattern.

According to this aspect, in some embodiments, the method further includes assigning to a second wireless device of the at least one wireless device a second time-frequency uplink transmission hopping pattern from the set of time-frequency uplink transmission hopping patterns, the second time-frequency uplink transmission hopping pattern being different from the first time-frequency uplink transmission hopping pattern. In some embodiments, the first time-frequency uplink transmission hopping pattern is based on at least one of traffic rate and Ultra-Reliable Low-Latency Communication (URLLC) requirements. In some embodiments, the first time-frequency uplink transmission hopping pattern partially overlaps with an existing time-frequency uplink transmission hopping pattern. In some embodiments, the first time-frequency uplink transmission hopping pattern is a dynamic time-frequency uplink transmission hopping pattern.

According to another aspect, a network node configured to schedule uplink transmissions for at least one wireless device is provided. The network node includes processing circuitry including a memory and a processor, the memory in communication with the processor, the memory having instructions that, when executed by the processor, configure the processor to define a set of time-frequency uplink transmission hopping patterns for the at least one wireless device, and assign to a first wireless device of the at least one wireless device, a first time-frequency uplink transmission hopping pattern from the set of time-frequency uplink transmission hopping patterns. The network node also includes a communications interface, the communications interface configured to receive, from the first wireless device, an uplink transmission of data packets, the uplink transmission based on the assigned first time-frequency uplink transmission hopping pattern.

According to some aspects, in some embodiments, the processor is further configured to assign to a second wireless device of the at least one wireless device a second time-frequency uplink transmission hopping pattern from the set of time-frequency uplink transmission hopping patterns, the second time-frequency uplink transmission hopping pattern being different from the first time-frequency uplink transmission hopping pattern. In some embodiments, the first time-frequency uplink transmission hopping pattern is based on at least one of traffic rate and Ultra-Reliable Low-Latency Communication (URLLC) requirements. In some embodiments, the first time-frequency uplink transmission hopping pattern partially overlaps with an existing time-frequency uplink transmission hopping pattern. In some embodiments, the first time-frequency uplink transmission hopping pattern is a dynamic time-frequency uplink transmission hopping pattern.

According to another aspect, a method in a wireless device for transmitting data packets in an uplink transmission to a network node is provided. The method includes receiving, from the network node, a time-frequency uplink transmission hopping pattern from a set of time-frequency uplink transmission hopping patterns, determining if data packets are to be sent to the network node, and if it is determined that the wireless device has data packets to be sent to the network node, transmitting, to the network node, an uplink transmission of the data packets, the uplink transmission based on the received time-frequency uplink transmission hopping pattern.

According to this aspect, in some embodiments, the time-frequency uplink transmission hopping pattern is based on at least one of traffic rate and Ultra-Reliable Low-Latency Communication (URLLC) requirements. In some embodiments, the method further includes re-transmitting the data packets to the network node upon a determination of a collision between an uplink transmission of the wireless device and an uplink transmission of at least one other wireless device. In some embodiments, the time-frequency uplink transmission hopping pattern partially overlaps with an existing time-frequency uplink transmission hopping pattern. In some embodiments, the time-frequency uplink transmission hopping pattern is a dynamic time-frequency uplink transmission hopping pattern According to another aspect, a wireless device for transmitting data packets in an uplink transmission to a network node is provided. The wireless device includes a communications interface, the communications interface configured to receive, from the network node, a time-frequency uplink transmission hopping pattern from a set of time-frequency uplink transmission hopping patterns, and processing circuitry including a memory and a processor, the memory in communication with the processor, the memory having instructions that, when executed by the processor, configure the processor to determine if data packets are to be sent to the network node. If it is determined that the wireless device has data packets to be sent to the network node, the communications interface is further configured to transmit to the network node, an uplink transmission of the data packets, the uplink transmission based on the received time-frequency uplink transmission hopping pattern.

According to this aspect, in some embodiments, wherein the time-frequency uplink transmission hopping pattern is based on at least one of traffic rate and Ultra-Reliable Low-Latency Communication (URLLC) requirements. In some embodiments, the communications interface is further configured to re-transmit the data packets to the network node upon a determination of a collision between an uplink transmission of the wireless device and an uplink transmission of at least one other wireless device. In some embodiments, the time-frequency uplink transmission hopping pattern partially overlaps with an existing time-frequency uplink transmission hopping pattern. In some embodiments, the time-frequency uplink transmission hopping pattern is a dynamic time-frequency uplink transmission hopping pattern.

According to another aspect, a network node configured to schedule uplink transmissions for at least one wireless device is provided. The network node includes a wireless device hopping pattern generator configured to define a set of time-frequency uplink transmission hopping patterns for the at least one wireless device, and assign to a first wireless device of the at least one wireless device, a first time-frequency uplink transmission hopping pattern from the set of time-frequency uplink transmission hopping patterns. The network node also includes a communications module, the communications module configured to receive, from the first wireless device, an uplink transmission of data packets, the uplink transmission based on the assigned first time-frequency uplink transmission hopping pattern.

According to another aspect, a wireless device for transmitting data packets in an uplink transmission to a network node is provided. The wireless device includes a communications module, the communications module configured to receive, from the network node, a time-frequency uplink transmission hopping pattern from a set of time-frequency uplink transmission hopping patterns. The wireless device also includes a data packet transmission determination module, the data packet transmission determination module configured to determine if data packets are to be sent to the network node. If it is determined that the wireless device has data packets to be sent to the network node, the communications module is further configured to transmit to the network node, an uplink transmission of the data packets, the uplink transmission based on the received time-frequency uplink transmission hopping pattern.

According to another aspect, a method in a network node for scheduling uplink transmissions for at least one wireless device is provided. The method includes assigning to a first wireless device of the at least one wireless device, a first time-frequency uplink transmission hopping pattern from a set of time-frequency uplink transmission hopping patterns; assigning to a second wireless device of the at least one wireless device, a second time-frequency uplink transmission hopping pattern from the set of time-frequency uplink transmission hopping patterns, the first time-frequency uplink transmission hopping pattern at least partially overlapping with the second time-frequency uplink transmission hopping pattern; and receiving, from the first wireless device, an uplink transmission of data packets, the uplink transmission based on the assigned first time-frequency uplink transmission hopping pattern.

According to this aspect, in some embodiments, the second time-frequency uplink transmission hopping pattern is different from the first time-frequency uplink transmission hopping pattern. In some embodiments, the first time-frequency uplink transmission hopping pattern is based on at least one of traffic rate and Ultra-Reliable Low-Latency-Communication (URLLC) requirements. In some embodiments, the method further includes, based on a detected collision of at least a portion of an uplink transmission corresponding to a portion of the first time-frequency uplink transmission hopping pattern that partially overlaps with the second time-frequency uplink transmission hopping pattern, sending at least one of a transmission suppression command requesting that one of the first wireless device and the second wireless device refrain from transmitting on the at least the portion of the uplink transmission; and a rescheduled time-frequency uplink transmission hopping pattern from the set of time-frequency uplink transmission hopping patterns. In some embodiments, the first time-frequency uplink transmission hopping pattern is a dynamic time-frequency uplink transmission hopping pattern.

According to another aspect, a network node configured to schedule uplink transmissions for at least one wireless device is provided. The network node includes processing circuitry configured to assign to a first wireless device of the at least one wireless device, a first time-frequency uplink transmission hopping pattern from the set of time-frequency uplink transmission hopping patterns; and assign to a second wireless device of the at least one wireless device, a second time-frequency uplink transmission hopping pattern from the set of time-frequency uplink transmission hopping patterns, the first time-frequency uplink transmission hopping pattern at least partially overlapping with the second time-frequency uplink transmission hopping pattern. The network node further includes a communications interface, the communications interface configured to receive, from the first wireless device, an uplink transmission of data packets, the uplink transmission based on the assigned first time-frequency uplink transmission hopping pattern.

According to this aspect, in some embodiments, the second time-frequency uplink transmission hopping pattern is different from the first time-frequency uplink transmission hopping pattern. In some embodiments, the first time-frequency uplink transmission hopping pattern is based on at least one of traffic rate and Ultra-Reliable Low-Latency Communication (URLLC) requirements. In some embodiments, the processing circuitry is further configured to cause the communications interface to, based on a detected collision of at least a portion of an uplink transmission corresponding to a portion of the first time-frequency uplink transmission hopping pattern that partially overlaps with the second time-frequency uplink transmission hopping pattern, send at least one of: a transmission suppression command requesting that one of the first wireless device and the second wireless device refrain from transmitting on the at least the portion of the uplink transmission; and a rescheduled time-frequency uplink transmission hopping pattern from the set of time-frequency uplink transmission hopping patterns. In some embodiments, the first time-frequency uplink transmission hopping pattern is a dynamic time-frequency uplink transmission hopping pattern.

According to another aspect, a method in a wireless device for transmitting data packets in an uplink transmission to a network node is provided. The method includes receiving, from the network node, a time-frequency uplink transmission hopping pattern from a set of time-frequency uplink transmission hopping patterns; determining if at least one data packet is to be sent to the network node; and if it is determined that at least one data packet is to be sent to the network node: transmitting, to the network node, an uplink transmission of the at least one data packet, the uplink transmission based on the received time-frequency uplink transmission hopping pattern, the received time-frequency uplink transmission hopping pattern at least partially overlapping with an existing time-frequency uplink transmission hopping pattern from the set of time-frequency uplink transmission hopping patterns assigned to at least one other wireless device.

According to this aspect, in some embodiments, the time-frequency uplink transmission hopping pattern is based on at least one of traffic rate and Ultra-Reliable Low-Latency Communication (URLLC) requirements. In some embodiments, the method further includes re-transmitting the at least one data packet to the network node upon a determination of a collision between an uplink transmission of the wireless device and an uplink transmission of the at least one other wireless device. In some embodiments, the method further includes, based on a determination of a collision between an uplink transmission of the wireless device and an uplink transmission of the at least one other wireless device, receiving at least one of: a transmission suppression command requesting that the first wireless device refrain from transmitting on at least a portion of the uplink transmission of the wireless device; and a rescheduled time-frequency uplink transmission hopping pattern from the set of time-frequency uplink transmission hopping patterns. In some embodiments, the time-frequency uplink transmission hopping pattern is a dynamic time-frequency uplink transmission hopping pattern.

According to another aspect, a wireless device for transmitting data packets in an uplink transmission to a network node is provided. The wireless device includes a communications interface, the communications interface configured to receive, from the network node, a time-frequency uplink transmission hopping pattern from a set of time-frequency uplink transmission hopping patterns; and processing circuitry. The processing circuitry is configured to determine if at least one data packet is to be sent to the network node; and the communications interface is further configured to, if it is determined that at least one data packet is to be sent to the network node, transmit to the network node an uplink transmission of the data packets, the uplink transmission based on the received time-frequency uplink transmission hopping pattern, the received time-frequency uplink transmission hopping pattern at least partially overlapping with an existing time-frequency uplink transmission hopping pattern from the set of time-frequency uplink transmission hopping patterns assigned to at least one other wireless device.

According to this aspect, in some embodiments, the time-frequency uplink transmission hopping pattern is based on at least one of traffic rate and Ultra-Reliable Low-Latency Communication (URLLC) requirements. In some embodiments, the communications interface is further configured to re-transmit the at least one data packet to the network node upon a determination of a collision between an uplink transmission of the wireless device and an uplink transmission of at least one other wireless device. In some embodiments, the communications interface is further configured to, based on a determination of a collision between an uplink transmission of the wireless device and an uplink transmission of the at least one other wireless device, receive at least one of: a transmission suppression command requesting that the first wireless device refrain from transmitting on at least a portion of the uplink transmission of the wireless device; and a rescheduled time-frequency uplink transmission hopping pattern from the set of time-frequency uplink transmission hopping patterns. In some embodiments, the first time-frequency uplink transmission hopping pattern is a dynamic time-frequency uplink transmission hopping pattern.

According to another aspect, a network node configured to schedule uplink transmissions for at least one wireless device is provided. The network node includes a wireless device hopping pattern generator configured to: assign to a first wireless device of the at least one wireless device, a first time-frequency uplink transmission hopping pattern from the set of time-frequency uplink transmission hopping patterns; and assign to a second wireless device of the at least one wireless device, a second time-frequency uplink transmission hopping pattern from the set of time-frequency uplink transmission hopping patterns, the first time-frequency uplink transmission hopping pattern at least partially overlapping with the second time-frequency uplink transmission hopping pattern. The network node further includes a communications module, the communications module configured to receive, from the first wireless device, an uplink transmission of data packets, the uplink transmission based on the assigned first time-frequency uplink transmission hopping pattern.

According to yet another aspect, a wireless device for transmitting data packets in an uplink transmission to a network node is provided. The wireless device includes a communications module, the communications module configured to receive, from the network node, a time-frequency uplink transmission hopping pattern from a set of time-frequency uplink transmission hopping patterns; and a data packet transmission determination module, the data packet transmission determination module configured to determine if at least one data packet is to be sent to the network node. The communications module is further configured to, if it is determined that at least one data packet is to be sent to the network node, transmit to the network node an uplink transmission of the at least one data packet, the uplink transmission based on the received time-frequency uplink transmission hopping pattern, the received time-frequency uplink transmission hopping pattern at least partially overlapping with an existing time-frequency uplink transmission hopping pattern from the set of time-frequency uplink transmission hopping patterns assigned to at least one other wireless device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
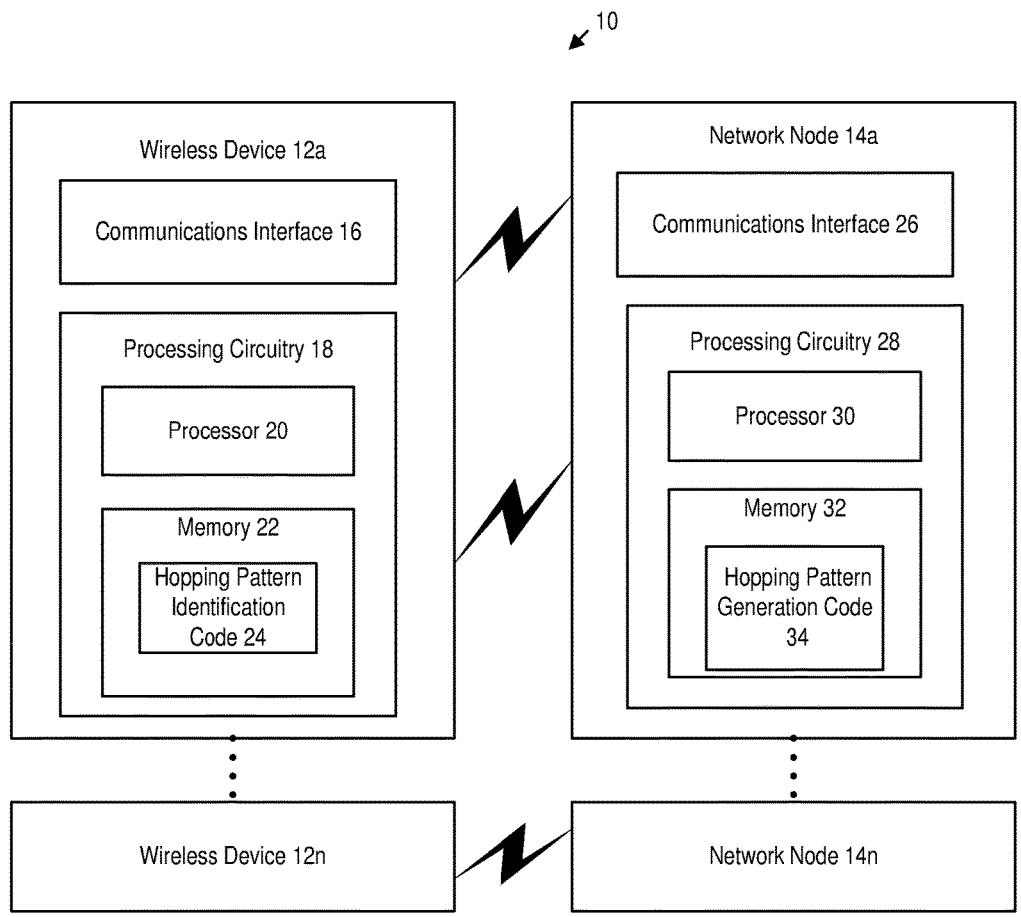
FIG. 1 is a block diagram of an exemplary system for assigning hopping patterns to wireless devices in a communications network in accordance with the principles of the disclosure.

In order to reduce the latency caused by wireless devices (e.g., UEs) waiting to send information in an UL transmission, various techniques for have been developed, such as, for example, pre-allocating transmission resources to the wireless device in anticipation of possible packet transmissions and reducing the TTI (e.g., sTTI). Unfortunately, such techniques have drawbacks. For example, pre-allocated resources may be wasted if the wireless device does not have anything to send and more resources are needed in the frequency domain for shorter TTIs, which can lead to a shortage of frequency resources. Accordingly, embodiments of the present disclosure provide for a resource allocation scheme with time-frequency hopping patterns that can reduce latency for wireless devices assigned such hopping patterns by, for example, a network node, which hopping patterns may also overlap in embodiments in order to increase resource allocation efficiency.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The contents of the present disclosure are described within the context of LTE for the purposes of ease of presentation and understanding. It should be understood that the problems and solutions described herein are equally applicable to other access technologies and standards, in particular, NR, which is an evolved technique from LTE.

Further, note that although terminology from the third generation partnership project (3GPP), i.e., long term evolution (LTE) is used in this disclosure to as an example, this should not be seen as limiting the scope of the disclosure to only the aforementioned system. Other wireless systems, including NR (i.e., 5G), wideband code division multiple access (WCDMA), WiMax, ultra mobile broadband (UMB) and global system for mobile communications (GSM), may also benefit from exploiting the concepts and methods covered within this disclosure.

Also note that terminology such as eNodeB and wireless device should be considered non-limiting and does in particular not imply a certain hierarchical relation between the two; in general "eNodeB" could be considered as device 1 and "wireless device" device 2, and these two devices communicate with each other over some radio channel. Also, while the disclosure focuses on wireless transmissions in the downlink, but embodiments are equally applicable in the uplink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles, etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to creating a reference signal sequence at a reduced peak to average ratio. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, the present disclosure advantageously enables uplink resource reuses so that a larger number of wireless devices can be supported with URLLC performance given a limited amount of time and frequency resources. In other words, a higher system capacity is achieved. Extra information can be embedded into the fixed hopping pattern assigned to each wireless device, for example, the redundant version of HARQ packets can be encoded into the frequency location of the resource blocks. The knowledge of the hopping pattern further facilitates efficient re-scheduling of resource blocks once collisions are detected, In one embodiment, a set of time-frequency hopping patterns is defined and described for UL transmissions. Each wireless device is assigned a hopping pattern explicitly from the network node by (Radio Resource Control) RRC protocol. The wireless device uses these physical resources to transmit duplicated or soft-combined packets for the delivery of a single URLLC message, if it has any data to send.

FIG. 1 is a block diagram of an exemplary system for assigning hopping patterns to wireless devices in a communications network, and designated generally as "10." System 10 includes one or more wireless devices 12a-12n (collectively referred to as wireless device 12) in communication with one or more network nodes 14a-14n (collectively referred to as network node 14), other wireless devices 12 and/or one or more other elements in system 10, via one or more communication links, paths and/or networks using one or more communication protocols, where wireless device 12 and network node 14 are configured to perform processes described herein. Although network node 14 is shown as a single node 14, it is contemplated that the functions described herein with respect to network node 14 may be divided or distributed among multiple network nodes 14.

Wireless device 12 includes communication circuitry 16 for communicating with one or more other wireless devices 12, network nodes 14, and/or other elements in system 10. In one or more embodiments, communication interface 16 includes one or more transmitters, one or more receivers, and/or one or more communication interfaces.

Wireless device 12 includes processing circuitry 18. In one embodiment, processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication.

Processing circuitry 18 may be configured to control any of the methods and/or processes described herein and/or to cause such methods and/or processes to be performed, e.g., by wireless device 12. Processor 20 corresponds to one or more processors 20 for performing wireless device 12 functions described herein. Wireless device 12 includes memory 22 that is configured to store data, programmatic software code and/or other information described herein.

In one or more embodiments, memory 22 is configured to store hopping pattern identification code 24. For example, hopping pattern identification code 24 includes instructions that, when executed by processor 20, cause processor 20 to perform some or all of the processes discussed in detail with respect to FIG. 9 herein below and embodiments discussed herein.

Network node 14 includes one or more communication circuitry 26 for communicating with one or more other network nodes 14, wireless device 12, and/or other elements in system 10. In one or more embodiments, communication circuitry 26 includes one or more transmitters, one or more receivers and/or one or more communication interfaces.

Network node 14 includes processing circuitry 28. Processing circuitry 28 includes processor 30 and memory 32. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of nodes, etc.

Processing circuitry 28 may be configured to control any of the methods and/or processes described herein and/or to cause such methods and/or processes to be performed, e.g., by network node 14. Processor 30 corresponds to one or more processors 30 for performing network node 14 functions described herein. Network node 14 includes memory 32 that is configured to store data, programmatic software code and/or other information described herein. In one or more embodiments, memory 32 is configured to store hopping pattern generation code 34. For example, hopping pattern generation code 34 includes instructions that, when executed by processor 30, cause processor 30 to perform some or all of the processes discussed in detail herein below with respect to FIG. 10 and embodiments discussed herein.

Figure 2:
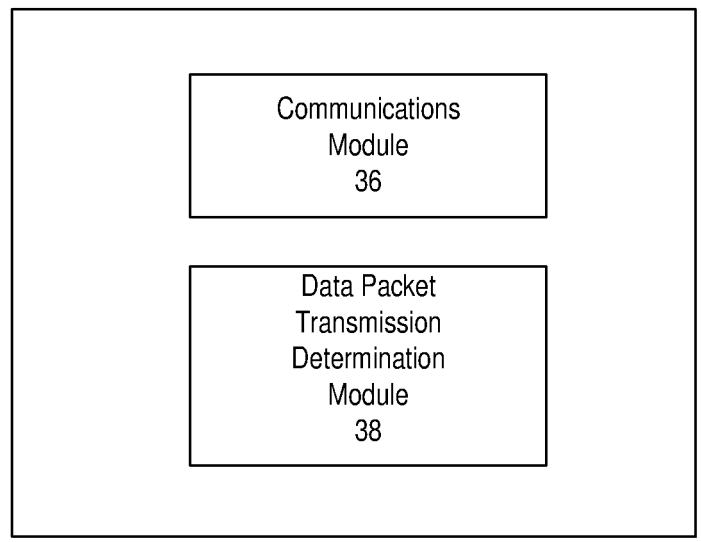
FIG. 2 is a block diagram of an alternate wireless device configured to utilize assigned hopping patterns in uplink transmissions to a network node in accordance with principles described herein.

FIG. 2 is a block diagram of an alternate wireless device 12 for utilizing assigned hopping patterns in uplink transmissions to network node 14 and for transmitting data packets to the network node 14 in accordance with the assigned hopping patterns. In this embodiment, a communications module 36 is configured to receive, from network node 14, a time-frequency uplink transmission hopping pattern from a set of time-frequency uplink transmission hopping patterns. In this embodiment, wireless device 12 also includes a data packet transmission determination module 38, the data packet transmission determination module configured to determine if data packets are to be sent to the network node 14. If it is determined that the wireless device 12 has data packets to be sent to the network node 14, the communications module 36 is further configured to transmit to the network node 14, an uplink transmission of the data packets, the uplink transmission based on the received time-frequency uplink transmission hopping pattern.

Figure 3:
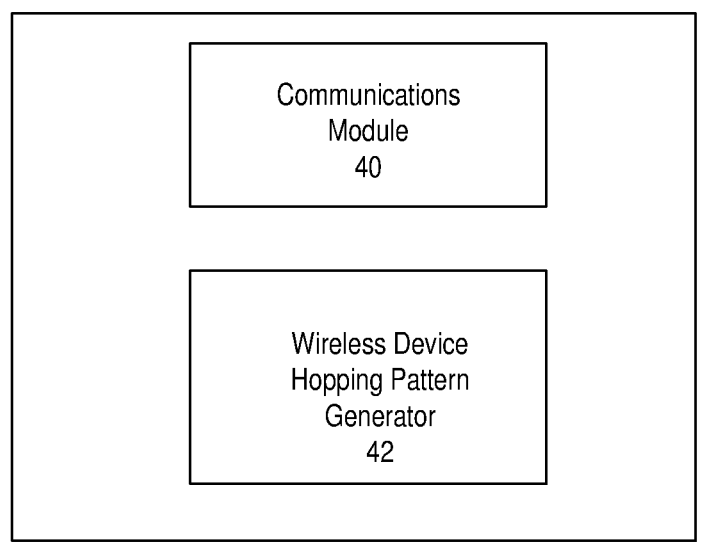
FIG. 3 is a block diagram of an alternate network node for assigning hopping patterns to wireless devices in a communications network in accordance with principles described herein.

FIG. 3 is a block diagram of an alternate network node 14 for assigning hopping patterns to wireless devices 12 in order to schedule uplink transmissions for the wireless devices 12. In this embodiment, network node 14 includes a communications module 40 and a wireless device hopping pattern generator 42 configured to define a set of time-frequency uplink transmission hopping patterns for at least one wireless device 12 and to assign to a first wireless device 12, a first time-frequency uplink transmission hopping pattern from the set of time-frequency uplink transmission hopping patterns. Communications module 40 is configured to receive, from the first wireless device 12, an uplink transmission of data packets, the uplink transmission based on the assigned first time-frequency uplink transmission hopping pattern.

Having generally described various embodiments of the present disclosure and components that may be used in some embodiments, a more detailed description of embodiments will now be described.

Wireless Device Hopping Pattern

Figure 4:
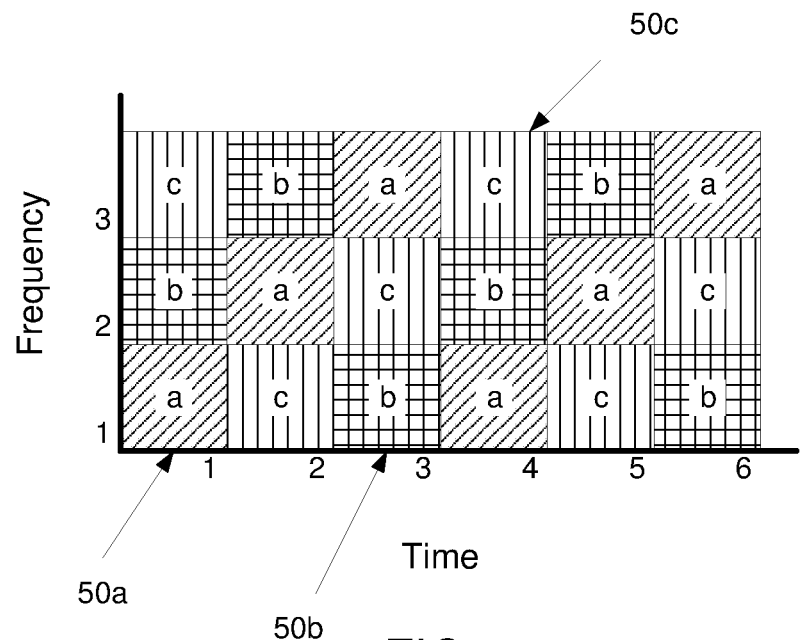
FIG. 4 is a diagram illustrating three uplink hopping patterns for three wireless devices.

Different uplink patterns are pre-defined. At run time, an uplink transmission hopping pattern is assigned by the network node to each wireless device, as shown in FIG. 4. In this example, each of the three wireless devices (WD)s (WD-a 12a, WD-b 12b, WD-c 12c) has a repetitive hopping pattern 50a, 50b, and 50c (collectively referred to as hopping pattern 50), respectively, with three consecutive transmissions, which are spread in different time and frequency. This pattern is repeated for two-times within a total of six TTIs. The WDs 12 transmit duplicate packets or soft-combined packets in the allocated resource blocks, if they have any packets to send. The hopping pattern 50 can also span more than one frequency resource block.

The wireless device 12 transmits according to the pattern starting from any TTI, according to configuration, and transmits for a configured number of TTIs. The used frequency resources will either be the same independent on transmission start (dynamic pattern), or different (fixed time pattern). In one embodiment, a hopping pattern 50 includes N transmissions in consecutive TTIs, or can be composed of more than one frequency resource block in one TTI.

Wireless Device Hopping Pattern with Partial Overlapping—Fixed in Subframe

Figure 5:
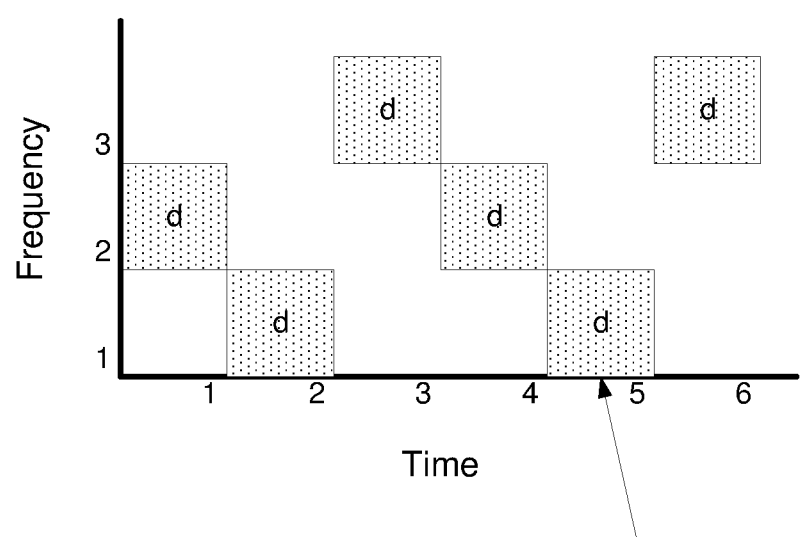
FIG. 5 is a diagram illustrating uplink hopping patterns for a single wireless device.
Figure 6:
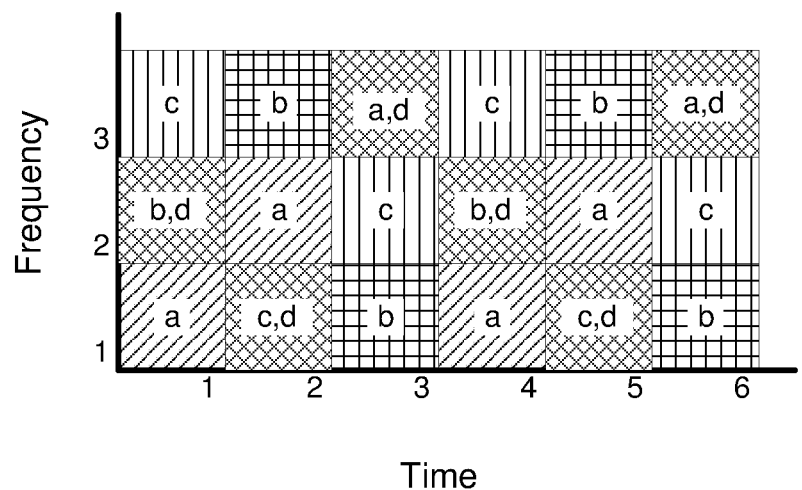
FIG. 6 is a diagram illustrating four uplink hopping patterns for four wireless devices showing the location of possible collisions.

The network node allocates one UL hopping pattern 50 that might partially overlap with an existing hopping pattern 50. As a follow-up example, the network node 14 schedules the fourth wireless device (i.e., Wireless device (WD)-d 12d) in another hopping pattern 50d that is spread in frequency so that the potential collisions are spread among as many wireless devices 12 as possible. As shown in FIG. 5 and in FIG. 6, the hopping pattern 50d is assigned so that WD-d 12d gets transmission opportunities unless all three other wireless devices 12a-c happen to have packets to transmit.

Compared to random contention access in which all four wireless devices 12a-d might collide in one resource block, the collision probabilities are smaller in this allocation because WD-a 12a, WD-b 12b, and WD-c 12c are scheduled on orthogonal resources.

In this case, WD-d 12d gets a URLLC service with two transmissions under the condition that not all other three wireless devices 12a-c are activated. Recall that even though the transmissions are scheduled, the wireless device 12 only needs to transmit if it has URLLC data. This scheme targets the URLLC use case with sporadic and low-load traffic.

Figure 7:
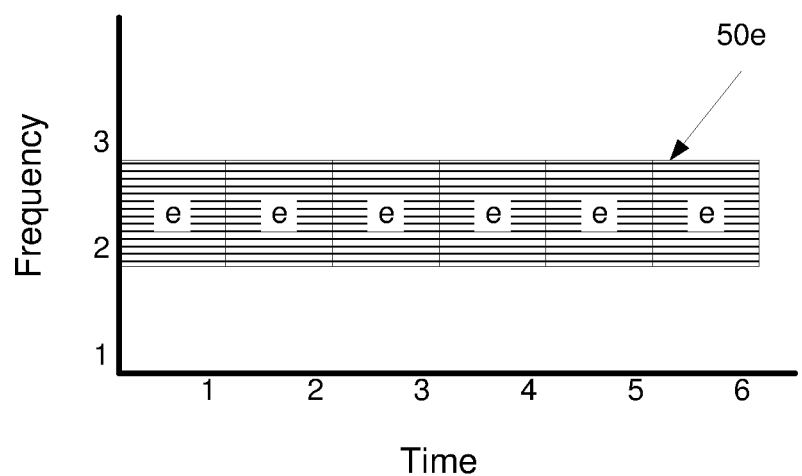
FIG. 7 is a diagram illustrating uplink hopping patterns for a different wireless device.
Figure 8:
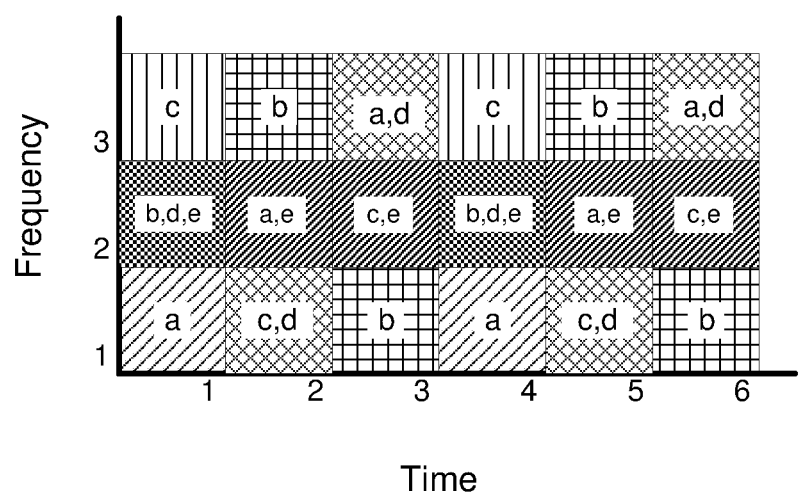
FIG. 8 is a diagram illustrating five uplink hopping patterns for five wireless devices showing the possible collisions for five nodes.

Similarly, FIG. 7 and FIG. 8 show an example of scheduling the fifth wireless device (WD-e) 12e. The idea is that the hopping pattern 50e of WD-e 12e is allocated so that it will have a chance to transmit unless all other four wireless devices 12a-d are active at the same time.

As a general rule, if the URLLC requirement is stricter, then the network node allocates a hopping pattern 50 that collides in fewer places with the wireless device 12 that has smaller amount of traffic. On the other hand, if the URLLC requirement is less strict, then the network node 14 allocates a hopping pattern 50 that collides in more places with the wireless device 12 that has larger amount of traffic. In one embodiment, the hopping pattern 50 design considers the traffic rate and URLLC requirement of the use cases, etc.

Hopping Pattern—Dynamic

In this embodiment, instead of a fixed pattern, where a transmission in a time-frequency resource would map to a wireless device 12, each wireless device 12 can be configured with a dynamic pattern 50. An example is configuring WD-a 12a with the sequence 1-2-3 and allowing it to use this sequence starting from any TTI. This allows the receiver to associate a transmission from a wireless device 12 to a certain sequence index. If in this example, the receiver detects WD-a 12a on resource 2, it infers that it is the second transmission in the sequence. This has two benefits:

Incremental redundancy can be applied, RV0, RV2, etc., and the receiver knows which version is used for a certain transmission; and the sequence index can be used to combine the whole range of transmitted messages, since if a second transmission is detected, the receiver knows that there was a first detection in the preceding TTI, and that there are possible transmissions in the sequence in later TTIs.

FIG. 5 shows that the hopping pattern 50d of WD-d 12d starts at time 1 and 4. The scheduling WD-d 12d can, however, start at any time (1,4) or (2,5) or (3,6), with the rest of the hopping sequence extended to the next sub-frame. The frequency hopping pattern 50d remains fixed at frequency location (2, 3, 1) for the first, the second and the third trials, respectively. Therefore, the WD-d 12d can start transmitting as soon as possible, without waiting for time 1 or 4. This is true for the fixed pattern also, but the used frequency resources will then vary depending on when the transmission starts. In one embodiment, the hopping pattern 50d starts at any time with a fixed frequency hopping pattern.

Collision Resolution

In order to satisfy some strict URLLC requirements, collision resolution mechanisms may be incorporated. The collision resolution mechanism should ensure in collision scenarios that the reliability requirement of the transmissions is not compromised.

In case of conservative allocation of repetition factor N, the transmissions are good enough with orthogonal resource utilization. Once overlapping resource allocation is performed, the reliability requirement of ongoing transmissions may be compromised. Since this scheme is intended for sporadic and low load traffic, the network has the capacity to be generous in repetition factor allocation, at least at the start. An advantage of this approach is that the reliability conditions are not compromised even with minor collisions on some resources. Otherwise, in case of conservative approach, the reliability conditions may be compromised on any collision.

In one embodiment, the network, e.g., system 10, is generous in allocating transmission repetition factor N to avoid compromising the reliability requirements in case of a collision. In case that there are collisions in one resource block, the network node 14 can extract which two wireless devices 12 have transmitted from the different cyclic shifts of DMRS.

In another embodiment, unique Demodulation Reference Signal (DMRS) cyclic shift indices are assigned to overlapping repetition patterns 50 to allow identification in the receiver. At collision, the network node 14 knows which wireless devices 12 have transmitted. Subsequently, the network node 14 can pinpoint any future collision location from the hopping pattern 50 so that it performs a fast re-schedule to avoid these collisions. For example, in FIG. 6, if the network node 14 detects that all four wireless devices (WD-a 12a, WD-b 12b, WD-c 12c, WDd 12d) transmit on TTI-1, then the network node 14 demands that WD-c 12c not transmit on TTI-2 and that WD-a 12a not transmit on TTI-3 to prioritize transmissions to WD-d 12d.

In one embodiment, based on the detected collisions at the current TTI and the hopping patterns 50 of the involved wireless devices 12, the network node 14 knows any future collisions. Subsequently, the network node 14 can do a fast-and-simple suppress command to a particular wireless device 12 to refrain from transmission and avoid possible collisions.

Following up the previous example, since WD-b 12b and WD-d 12d collide at TTI-1, the network node 14 can also re-schedule two separate collision-free transmissions after the end of the hopping pattern 50, possibly in another frequency band. In this case, the network node 14 allocates collision-free transmission resource blocks at TTI-4 to WD-b 12b and WD-d 12d, respectively, in frequency band 5 and 6. This is useful when the wireless devices 12 need some time to prepare transmission on different resource blocks, i.e., this gives some slack time on the wireless device 12.

In one embodiment, based on the detected collisions at the current TTI and the hopping patterns 50 of the involved wireless devices 12, the network node 14 can do a re-schedule of the collided wireless devices 12 to transmit at collision-free resource blocks after the original hopping patterns 50.

Figure 9:
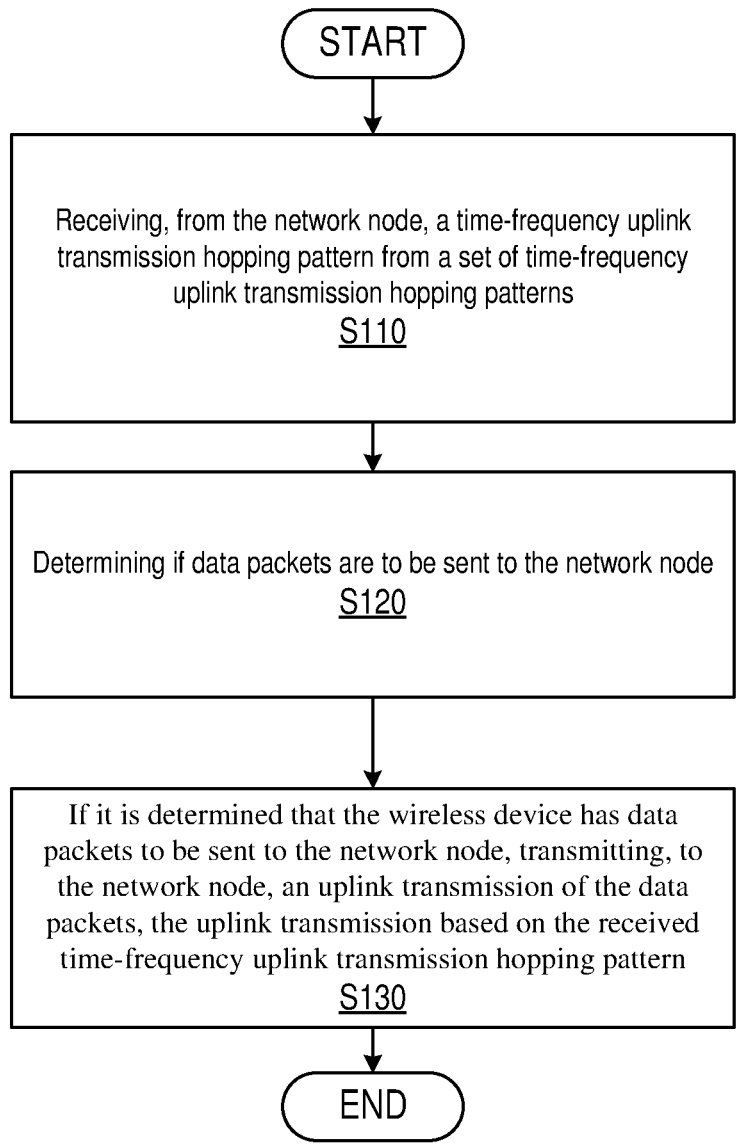
FIG. 9 is a flowchart of an exemplary process performed by a wireless device for utilizing assigned hopping patterns in uplink transmissions to a network node in accordance with principles described herein.

FIG. 9 is a flow diagram of a method, performed in wireless device 12 for utilizing assigned hopping patterns in uplink transmissions to network node 14 and for transmitting data packets to the network node 14 in accordance with the assigned hopping patterns. In one embodiment, the method includes receiving, by communications interface 16, from network node 14, a time-frequency uplink transmission hopping pattern from a set of time-frequency uplink transmission hopping patterns (Block S110), and determining, by processor 20, if data packets are to be sent to the network node (Block S120). If it is determined that the wireless device 12 has data packets to be sent to network node 14, communication interface 16 of wireless device 12 transmits to network node 14, an uplink transmission of the data packets, the uplink transmission based on the received time-frequency uplink transmission hopping pattern (Block S130).

In one embodiment, the time-frequency uplink transmission hopping pattern 50 is based on at least one of traffic rate and Ultra-Reliable Low-Latency Communication (URLLC) requirements.

In one embodiment, the method further includes retransmitting, by communication interface 16, the data packets to network node 14 upon a determination of a collision between an uplink transmission of wireless device 12 and an uplink transmission of at least one other wireless device 12.

In one embodiment, the time-frequency uplink transmission hopping pattern 50 partially overlaps with an existing time-frequency uplink transmission hopping pattern 50.

Figure 10:
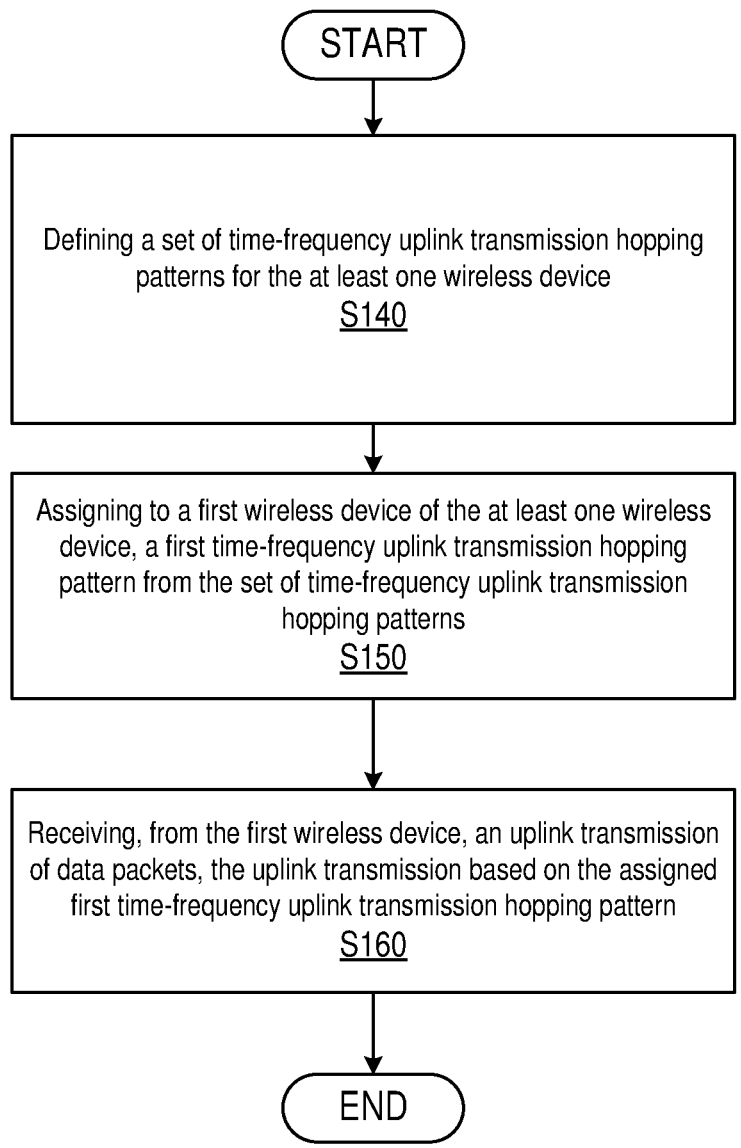
FIG. 10 is a flowchart of an exemplary process in a network node for assigning hopping patterns to wireless devices in a communications network in accordance with principles described herein.

In one embodiment, the time-frequency uplink transmission hopping pattern 50 is a dynamic time-frequency uplink transmission hopping pattern FIG. 10 is a flow diagram of a method, performed in network node 14, for assigning hopping patterns 50 to wireless devices 12 in order to schedule uplink transmissions for the wireless devices 12. In one embodiment, processor 30 of network node 14, in conjunction with hopping pattern generation code 34, defines a set of time-frequency uplink transmission hopping patterns 50 for at least one wireless device 12 (Block S140). Processor 30 of network node 14 assigns to a first wireless device 12 a first time-frequency uplink transmission hopping pattern 50 from the set of time-frequency uplink transmission hopping patterns 50 (Block S150). Communications interface 26 of network node 14 receives, from the first wireless device 12, an uplink transmission of data packets, the uplink transmission based on the assigned first time-frequency uplink transmission hopping pattern 50 (Block S160).

In one embodiment, the method further includes assigning to a second wireless device 12 a second time-frequency uplink transmission hopping pattern 50 from the set of time-frequency uplink transmission hopping patterns 50, the second time-frequency uplink transmission hopping pattern 50 being different from the first time-frequency uplink transmission hopping pattern 50.

In one embodiment, the first time-frequency uplink transmission hopping pattern 50 is based on at least one of traffic rate and Ultra-Reliable Low-Latency Communication (URLLC) requirements.

In one embodiment, the first time-frequency uplink transmission hopping pattern 50 partially overlaps with an existing time-frequency uplink transmission hopping pattern 50.

In one embodiment, the first time-frequency uplink transmission hopping pattern 50 is a dynamic time-frequency uplink transmission hopping pattern 50.

According to one aspect, a method in a network node 14 for scheduling uplink transmissions for at least one wireless device includes assigning to a first wireless device 12a of the at least one wireless device, a first time-frequency uplink transmission hopping pattern 50a from a set of time-frequency uplink transmission hopping patterns (block S150); assigning to a second wireless device 12d of the at least one wireless device, a second time-frequency uplink transmission hopping pattern 50d from the set of time-frequency uplink transmission hopping patterns (block S150), the first time-frequency uplink transmission hopping pattern 50a at least partially overlapping with the second time-frequency uplink transmission hopping pattern 50d; and receiving, from the first wireless device 12a, an uplink transmission of data packets, the uplink transmission based on the assigned first time-frequency uplink transmission hopping pattern 50a (block S160).

According to this aspect, in some embodiments, the second time-frequency uplink transmission hopping pattern 50d is different from the first time-frequency uplink transmission hopping pattern 50a. In some embodiments, the first time-frequency uplink transmission hopping pattern 50a is based on at least one of traffic rate and Ultra-Reliable Low-Latency-Communication (URLLC requirements. In some embodiments, the method further includes, based on a detected collision of at least a portion of an uplink transmission corresponding to a portion of the first time-frequency uplink transmission hopping pattern 50a that partially overlaps with the second time-frequency uplink transmission hopping pattern 50d, sending at least one of: a transmission suppression command requesting that one of the first wireless device 12a and the second wireless device 12d refrain from transmitting on the at least the portion of the uplink transmission; and a rescheduled time-frequency uplink transmission hopping pattern 50 from the set of time-frequency uplink transmission hopping patterns. In some embodiments, the first time-frequency uplink transmission hopping pattern 50a is a dynamic time-frequency uplink transmission hopping pattern.

According to another aspect, a network node 14 configured to schedule uplink transmissions for at least one wireless device. The network node 14 includes processing circuitry 28 configured to: assign to a first wireless device 12a of the at least one wireless device, a first time-frequency uplink transmission hopping pattern 50a from the set of time-frequency uplink transmission hopping patterns; and assign to a second wireless device 12d of the at least one wireless device, a second time-frequency uplink transmission hopping pattern 50d from the set of time-frequency uplink transmission hopping patterns, the first time-frequency uplink transmission hopping pattern 50a at least partially overlapping with the second time-frequency uplink transmission hopping pattern 50d. The network node 14 also includes a communications interface 26, the communications interface 26 configured to receive, from the first wireless device 12a, an uplink transmission of data packets, the uplink transmission based on the assigned first time-frequency uplink transmission hopping pattern 50a.

According to this aspect, in some embodiments, the second time-frequency uplink transmission hopping pattern 50d is different from the first time-frequency uplink transmission hopping pattern 50a. In some embodiments, the first time-frequency uplink transmission hopping pattern 50a is based on at least one of traffic rate and Ultra-Reliable Low-Latency Communication (URLLC) requirements. In some embodiments, the processing circuitry 28 is further configured to cause the communications interface 26 to, based on a detected collision of at least a portion of an uplink transmission corresponding to a portion of the first time-frequency uplink transmission hopping pattern 50a that partially overlaps with the second time-frequency uplink transmission hopping pattern 50d, send at least one of: a transmission suppression command requesting that one of the first wireless device 12a and the second wireless device 12d refrain from transmitting on the at least the portion of the uplink transmission; and a rescheduled time-frequency uplink transmission hopping pattern 50 from the set of time-frequency uplink transmission hopping patterns. In some embodiments, the first time-frequency uplink transmission hopping pattern 50a is a dynamic time-frequency uplink transmission hopping pattern.

According to another aspect, a method in a wireless device 12a for transmitting data packets in an uplink transmission to a network node 14 includes receiving, from the network node 14, a time-frequency uplink transmission hopping pattern 50a from a set of time-frequency uplink transmission hopping patterns (block S110); determining if at least one data packet is to be sent to the network node 14 (block S120); and if it is determined that at least one data packet is to be sent to the network node 14: transmitting, to the network node 14, an uplink transmission of the at least one data packet, the uplink transmission based on the received time-frequency uplink transmission hopping pattern 50a (block S130), the received time-frequency uplink transmission hopping pattern 50a at least partially overlapping with an existing time-frequency uplink transmission hopping pattern 50d from the set of time-frequency uplink transmission hopping patterns assigned to at least one other wireless device 12d.

According to this aspect, in some embodiments, time-frequency uplink transmission hopping pattern 50a is based on at least one of traffic rate and Ultra-Reliable Low-Latency Communication (URLLC) requirements. In some embodiments, the method further includes re-transmitting the at least one data packet to the network node 14 upon a determination of a collision between an uplink transmission of the wireless device 12a and an uplink transmission of the at least one other wireless device 12d. In some embodiments, the method further includes, based on a determination of a collision between an uplink transmission of the wireless device 12a and an uplink transmission of the at least one other wireless device 12d, receiving at least one of: a transmission suppression command requesting that the wireless device 12a refrain from transmitting on at least a portion of the uplink transmission of the wireless device 12a; and a rescheduled time-frequency uplink transmission hopping pattern 50 from the set of time-frequency uplink transmission hopping patterns. In some embodiments, the time-frequency uplink transmission hopping pattern 50a is a dynamic time-frequency uplink transmission hopping pattern.

According to another aspect, a wireless device 12a for transmitting data packets in an uplink transmission to a network node 14 is provided. The wireless device 12a includes a communications interface 16, the communications interface 16 configured to receive, from the network node 14, a time-frequency uplink transmission hopping pattern 50a from a set of time-frequency uplink transmission hopping patterns; and processing circuitry 18 configured to: determine if at least one data packet is to be sent to the network node 14. The communications interface 16 is further configured to, if it is determined that at least one data packet is to be sent to the network node 14, transmit to the network node 14 an uplink transmission of the data packets, the uplink transmission based on the received time-frequency uplink transmission hopping pattern 50a, the received time-frequency uplink transmission hopping pattern 50a at least partially overlapping with an existing time-frequency uplink transmission hopping pattern 50d from the set of time-frequency uplink transmission hopping patterns assigned to at least one other wireless device 12d.

According to this aspect, in some embodiments, the time-frequency uplink transmission hopping pattern 50a is based on at least one of traffic rate and Ultra-Reliable Low-Latency Communication (URLLC) requirements. In some embodiments, the communications interface 16 is further configured to re-transmit the at least one data packet to the network node 14 upon a determination of a collision between an uplink transmission of the wireless device 12a and an uplink transmission of at least one other wireless device 12d. In some embodiments, the communications interface 16 is further configured to, based on a determination of a collision between an uplink transmission of the wireless device 12a and an uplink transmission of the at least one other wireless device 12d, receive at least one of: a transmission suppression command requesting that the wireless device 12a refrain from transmitting on at least a portion of the uplink transmission of the wireless device 12a; and a rescheduled time-frequency uplink transmission hopping pattern 50 from the set of time-frequency uplink transmission hopping patterns. In some embodiments, the first time-frequency uplink transmission hopping pattern 50a is a dynamic time-frequency uplink transmission hopping pattern.

According to another aspect, a network node 14 configured to schedule uplink transmissions for at least one wireless device is provided. The network node 14 includes a wireless device hopping pattern generator 42 configured to: assign to a first wireless device 12a of the at least one wireless device, a first time-frequency uplink transmission hopping pattern 50a from the set of time-frequency uplink transmission hopping patterns; and assign to a second wireless device 12d of the at least one wireless device, a second time-frequency uplink transmission hopping pattern 50d from the set of time-frequency uplink transmission hopping patterns, the first time-frequency uplink transmission hopping pattern 50a at least partially overlapping with the second time-frequency uplink transmission hopping pattern 50d. The network node 14 also includes a communications module 40, the communications module 40 configured to receive, from the first wireless device 12a, an uplink transmission of data packets, the uplink transmission based on the assigned first time-frequency uplink transmission hopping pattern 50a.

According to yet another aspect, a wireless device for transmitting data packets in an uplink transmission to a network node 14. The wireless device includes a communications module 36, the communications module 36 configured to receive, from the network node 14, a time-frequency uplink transmission hopping pattern 50a from a set of time-frequency uplink transmission hopping patterns; and a data packet transmission determination module 38, the data packet transmission determination module 38 configured to determine if at least one data packet is to be sent to the network node 14. The communications module 36 is further configured to, if it is determined that at least one data packet is to be sent to the network node 14, transmit to the network node 14 an uplink transmission of the at least one data packet, the uplink transmission based on the received time-frequency uplink transmission hopping pattern 50a, the received time-frequency uplink transmission hopping pattern 50a at least partially overlapping with an existing time-frequency uplink transmission hopping pattern 50d from the set of time-frequency uplink transmission hopping patterns assigned to at least one other wireless device 12d.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

ABBREVIATIONS

Abbreviation Explanation
DL Downlink
DMRS Demodulation reference signal
eNB eNodeB
HARQ Hybrid Automatic Repeat Request
LTE Long Term Evolution
NR New Radio
RRC Radio Resource Control
sTTI Short TTI
TTI Transmission Time Interval
URLLC Ultra-Reliable and Low-Latency Communication
UE User Equipment
UL Uplink
3GPP 3rd Generation Partnership Project
5G Fifth Generation

What is claimed is:

1. A method in a network node for scheduling uplink transmissions for at least one wireless device, the method comprising:
   assigning to a first wireless device of the at least one wireless device, a first time-frequency uplink transmission hopping pattern from a set of time-frequency uplink transmission hopping patterns;
   assigning to a second wireless device of the at least one wireless device, a second time-frequency uplink transmission hopping pattern from the set of time-frequency uplink transmission hopping patterns, the first time-frequency uplink transmission hopping pattern at least partially overlapping with the second time-frequency uplink transmission hopping pattern;
   receiving, from the first wireless device, an uplink transmission of data packets, the uplink transmission based on the assigned first time-frequency uplink transmission hopping pattern; and
   based on a detected collision of at least a portion of an uplink transmission corresponding to a portion of the first time-frequency uplink transmission hopping pattern that partially overlaps with the second time-frequency uplink transmission hopping pattern, sending at least one of:
      a transmission suppression command requesting that one of the first wireless device and the second wireless device refrain from transmitting on the at least the portion of the uplink transmission; and
      a rescheduled time-frequency uplink transmission hopping pattern from the set of time-frequency uplink transmission hopping patterns.

2. The method according to claim 1, wherein the second time-frequency uplink transmission hopping pattern is different from the first time-frequency uplink transmission hopping pattern.

3. The method according to claim 1, wherein the first time-frequency uplink transmission hopping pattern is based on at least one of traffic rate and Ultra-Reliable Low-Latency-Communication, URLLC, requirements.

4. The method according to claim 1, wherein the first time-frequency uplink transmission hopping pattern is a dynamic time-frequency uplink transmission hopping pattern.

5. A network node configured to schedule uplink transmissions for at least one wireless device, the network node comprising:
   processing circuitry configured to:
      assign to a first wireless device of the at least one wireless device, a first time-frequency uplink transmission hopping pattern from a set of time-frequency uplink transmission hopping patterns; and
      assign to a second wireless device of the at least one wireless device, a second time-frequency uplink transmission hopping pattern from the set of time-frequency uplink transmission hopping patterns, the first time-frequency uplink transmission hopping pattern at least partially overlapping with the second time-frequency uplink transmission hopping pattern; and
   a communications interface, the communications interface configured to:
      receive, from the first wireless device, an uplink transmission of data packets, the uplink transmission based on the assigned first time-frequency uplink transmission hopping pattern; and
      based on a detected collision of at least a portion of an uplink transmission corresponding to a portion of the first time-frequency uplink transmission hopping pattern that partially overlaps with the second time-frequency uplink transmission hopping pattern, send at least one of:
         a transmission suppression command requesting that one of the first wireless device and the second wireless device refrain from transmitting on the at least the portion of the uplink transmission; and
         a rescheduled time-frequency uplink transmission hopping pattern from the set of time-frequency uplink transmission hopping patterns.

6. The network node according to claim 5, wherein the second time-frequency uplink transmission hopping pattern is different from the first time-frequency uplink transmission hopping pattern.

7. The network node according to claim 5, wherein the first time-frequency uplink transmission hopping pattern is based on at least one of traffic rate and Ultra-Reliable Low-Latency Communication, URLLC, requirements.

8. The network node according to claim 5, wherein the first time-frequency uplink transmission hopping pattern is a dynamic time-frequency uplink transmission hopping pattern.

9. A method in a wireless device for transmitting data packets in an uplink transmission to a network node, the method comprising:
   receiving, from the network node, a time-frequency uplink transmission hopping pattern from a set of time-frequency uplink transmission hopping patterns;
   determining if at least one data packet is to be sent to the network node;
   if it is determined that at least one data packet is to be sent to the network node:
      transmitting, to the network node, an uplink transmission of the at least one data packet, the uplink transmission based on the received time-frequency uplink transmission hopping pattern, the received time-frequency uplink transmission hopping pattern at least partially overlapping with an existing time-frequency uplink transmission hopping pattern from the set of time-frequency uplink transmission hopping patterns assigned to at least one other wireless device; and
   based on a determination of a collision between an uplink transmission of the wireless device and an uplink transmission of the at least one other wireless device, receiving at least one of:
      a transmission suppression command requesting that the wireless device refrain from transmitting on at least a portion of the uplink transmission of the wireless device; and
      a rescheduled time-frequency uplink transmission hopping pattern from the set of time-frequency uplink transmission hopping patterns.

10. The method according to claim 9, wherein the time-frequency uplink transmission hopping pattern is based on at least one of traffic rate and Ultra-Reliable Low-Latency Communication, URLLC, requirements.

11. The method according to claim 9, further comprising re-transmitting the at least one data packet to the network node as a result of the determination of the collision between the uplink transmission of the wireless device and the uplink transmission of the at least one other wireless device.

12. The method according to claim 9, wherein the time-frequency uplink transmission hopping pattern is a dynamic time-frequency uplink transmission hopping pattern.

13. A wireless device for transmitting data packets in an uplink transmission to a network node, the wireless device comprising:
   processing circuitry configured to:
      determine if at least one data packet is to be sent to the network node; and
   a communications interface, the communications interface configured to:
      receive, from the network node, a time-frequency uplink transmission hopping pattern from a set of time-frequency uplink transmission hopping patterns;
   if it is determined that at least one data packet is to be sent to the network node, transmit to the network node an uplink transmission of the data packets, the uplink transmission based on the received time-frequency uplink transmission hopping pattern, the received time-frequency uplink transmission hopping pattern at least partially overlapping with an existing time-frequency uplink transmission hopping pattern from the set of time-frequency uplink transmission hopping patterns assigned to at least one other wireless device; and
      based on a determination of a collision between an uplink transmission of the wireless device and an uplink transmission of the at least one other wireless device, receive at least one of:
         a transmission suppression command requesting that the wireless device refrain from transmitting on at least a portion of the uplink transmission of the wireless device; and
         a rescheduled time-frequency uplink transmission hopping pattern from the set of time-frequency uplink transmission hopping patterns.

14. The wireless device according to claim 13, wherein the time-frequency uplink transmission hopping pattern is based on at least one of traffic rate and Ultra-Reliable Low-Latency Communication, URLLC, requirements.

15. The wireless device according to claim 13, wherein the communications interface is further configured to re-transmit the at least one data packet to the network node as a result of the determination of the collision between the uplink transmission of the wireless device and the uplink transmission of the at least one other wireless device.

16. The wireless device according to claim 13, wherein the time-frequency uplink transmission hopping pattern is a dynamic time-frequency uplink transmission hopping pattern.

* * * * *